June 21, 1966 P. GEFFROY 3,256,820
ROTARY PUMP
Filed May 19, 1964 2 Sheets-Sheet 1
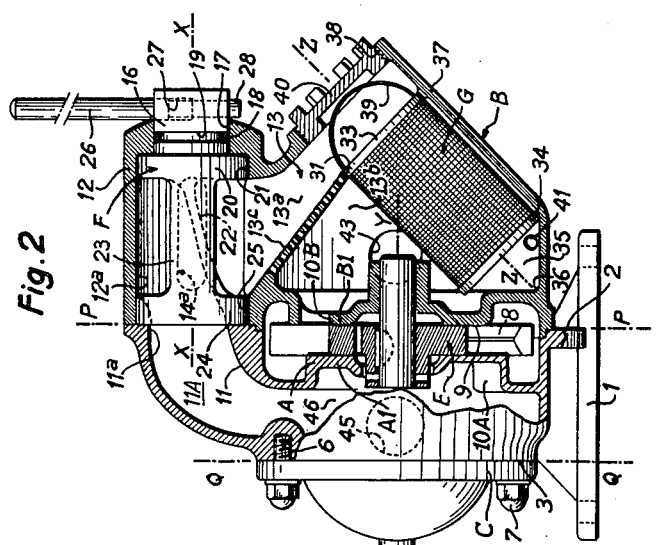
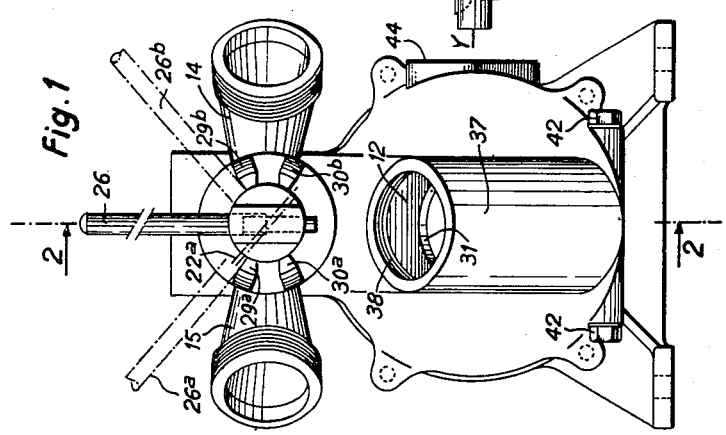
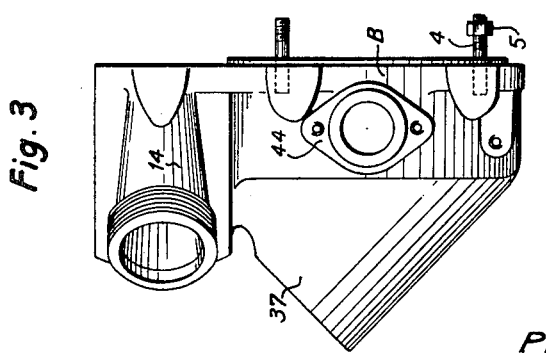
INVENTOR.
PIERRE GEFFROY
BY
ATTORNEYS June 21, 1966  P. GEFFROY  3,256,820
ROTARY PUMP Filed May 19, 1964  2 Sheets-Sheet 2

INVENTOR.
PIERRE GEFFROY
BY
ATTORNEYS

United States Patent Office 3,256,820
Patented June 21, 1966

3,256,820
ROTARY PUMP
Pierre Geffroy, 6 Rue des Chantiers, Paris, France
Filed May 19, 1964, Ser. No. 368,468
Claims priority, application France, Dec. 30, 1960,
848,522, Patent 1,310,479
5 Claims. (Cl. 103—3)

The present patent application is a continuation-in-part of patent application Serial No. 162,512 filed December 27, 1961, now abandoned.

The invention concerns a centrifugal pump and in particular an automatically primed pump which is simple in construction, easy to maintain, very easy to operate, cheap to make and highly efficient; this pump is especially adapted to pump liquids and in particular decant wines, ciders, alcohols, hydrocarbon fuels and the like.

This pump comprises at least one pump housing containing an impeller and having an inlet port and an outlet port and a cylindrical distributor body including a rotatable distributor member and disposed parallel with the axis of the impeller.

One object of the invention is to provide a pump of this type in which the liquid current follows, between the distributor and the inlet port, and between the outlet port and the distributor a path the length of which is minimum, so that the pressure losses in the liquid circuits inside this pump are reduced to the maximum extent, whereby a corresponding increase in pump efficiency will be attained.

The centrifugal pump according to the invention comprises: at least one pump housing, a shaft rotatably mounted in said pump housing, an impeller mounted on said shaft, said pump housing having an inlet port and an outlet port; a cylindrical distributor body defining a distribution chamber and disposed parallel with said shaft; a distributor member rotatably mounted in the distribution chamber; an inlet conduit communicating with the distribution chamber and the inlet port, and an outlet conduit communicating with the outlet port and the distribution chamber; said inlet conduit and said outlet conduit having a wall portion in common with said pump housing.

Other features and advantages of the invention will be apparent from the ensuing description with reference to the accompanying drawings, to which the invention is in no way limited, the scope of the invention being defined by the claims.

In the drawings:

FIG. 1 is a front elevational view of a pump in accordance with the invention;

FIG. 2 is an axial longitudinal sectional view taken along line 2—2 of FIG. 1, a part being shown in elevation;

FIG. 3 is a side elevational view of the side auxiliary inlet body;

Figure 4:
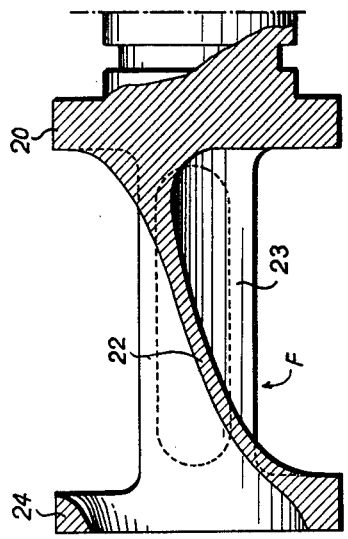
FIG. 4 is a longitudinal sectional view of the rotary distributor member.

As shown in the drawings, the pump comprises a delivery body A rigid with a stand 1. The body A has two vertical flat machined faces 2 and 3 located in two vertical parallel planes P—P and Q—Q, the face 2 being adapted to receive an auxiliary inlet body B and the other face 3 being adapted to receive a rear lateral cover C. The body B and the cover C are secured to the body A by studs 4 and nuts 5 and studs 6 and nuts 7 respectively.

The rear cover C contains a rolling bearing (not shown) for a drive shaft D on which is mounted the impeller E located in a pump chamber 8 defined by a pump housing 9 formed by wall portions A1 and B1 of the bodies A and B, respectively.

The impeller E draws liquid through an inlet port 10B formed in the wall portion B1 of the body B, and discharges it through an outlet chamber 11A defined by an outlet conduit 11 which is formed directly in the pump body A and communicates with the pump chamber 8 by way of an outlet port 10A and with the face 2 by way of an orifice 11a.

The auxiliary inlet body B comprises a cylindrical distributor body 12 defining a cylindrical distribution chamber 12a whose axis X—X is contained in a plane parallel with the axis Y—Y of the shaft of the pump and is also parallel with the axis Y—Y. Communicating with the distribution chamber 12a by way of the port 11a, is the outlet conduit 11 and, laterally: on the one hand, two connections 14 and 15 (FIGS. 2 and 3) disposed outside the body B, the connection 14 being, for example, provided for the inlet and the connection 15 for the delivery of the pumped liquid and, on the other hand, the upstream end of an inlet conduit 13 defining an inlet chamber 13a adjoining a suction chamber 13b; the chambers 13a and 13b extend below the distributor body; each of these chambers has a wall portion which joins the wall portion B1 and these two chambers 13a, 13b communicate with one another through a perforated wall portion 13c. It is thus clear that the inlet chamber 13a of the inlet conduit 13 communicates directly with the distribution chamber 12a and with the suction chamber 13b, and the latter communicates directly with the inlet chamber 13a and the pump chamber 8, and suction applies the liquid flow against the wall B1, so that the liquid flows from the distribution chamber into the pump chamber 8 along a path the length of which is minimum.

The functions of the connections 14 and 15 can be reversed by a cylindrical distributor member F mounted in the cylindrical chamber 12a for rotation about the axis X—X. The member F constitutes a valve and is adapted to put the connection 14 either in communication with the inlet chamber 13a, the outlet chamber 11A being then connected to the connection 15 which constitutes the outlet pipe for the delivered liquid or in communication with the outlet chamber 11A, the connection 15 being put in communication with the inlet chamber 13a.

Figure 5:
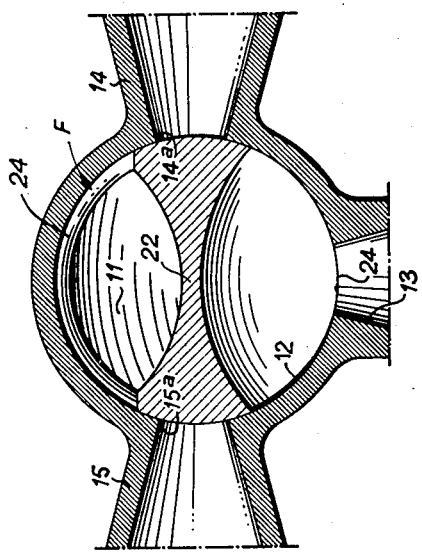
FIG. 5 is a cross-sectional view of the distributor body with its inlet and outlet connections.

The member F is constituted by a machine-turned member which comprises a cylindrical journal 16 rotatively mounted in a bearing 17 provided in the body B, an automatic sealing ring 18 being disposed in a groove 19 and in the journal; a first cylindrical portion 20 adjacent the journal and adapted to turn in an internal bearing 21 formed in the cover A; a thin curved and oblique web 22 adapted to separate the inlet orifice from the outlet orifice, this web (see the longitudinal sectional view in FIG. 4) being connected to two lateral portions 23 which, in the illustrated position, close off the oblong apertures 14a and 15a (FIG. 5) through which each of the connections 14 and 15 communicate with the chamber 12 in diametrally opposed positions; and a cylindrical portion 24 adapted to turn in a corresponding bearing 25 formed in the cover B.

The rotary distributor member F, which in the illustrated position closes the two diametrally opposed apertures 14a and 15a, can be turned through the medium of an outer operating lever 26 so as to uncover these apertures and put one in communication with the inlet chamber 13a and the other in communication with the outlet chamber 11A. The lever 26 extends through the journal 16 in which it is screw-threadedly engaged at 27. This lever and its end 28 extending beyond the journal cooperate with either one of two pairs of abutments 29a–30b and 29b–30a adapted to limit the angular movement of the distributor about the axis X—X by stopping the lever 26 either in the position 26$^a$, in which the web 22 of the distributor assumes the position 22$^a$ and the connection 14 is in communication with the outlet chamber 11A while the connection 15 is connected to the inlet chamber 13$^a$ or in the position 26$^b$ in which the communications are reversed.

It will be observed that the member F is very easy to operate, the forces required for its operation being much less than those required to rotate a distributor having a ground conical bearing. Fluid tightness between the inlet and outlet of the pump has been found to be amply sufficient, since the passages of the liquid between the inlet and outlet chambers are limited to a very small percentage, without the least importance, of the pumped and delivered flow.

The inlet chamber 13$^a$ defined by the conduit 13 communicates with the suction chamber 13b, by way of the small apertures made in the inner wall 13c, as mentioned hereinbefore, and moreover, by way of a circular aperture 31 formed in the lower portion 13b of the suction of said inner wall. It is clear that this aperture communicates directly with the pump chamber 8 by way of the inlet port 10B.

Engaged in the aperture 31 in a fluidtight manner owing to the provision of a flange 33, is a filtering strainer G whose cylindrical peripheral wall is perforated and retains particles of undesirable size and whose solid bottom 34 is preferably pointed at 35 so as to maintain the strainer in position by abutment at 36 in the bottom of the body B.

The strainer G has its axis Z—Z disposed obliquely, this axis extending upwardly from the point 36 to the upper sealing flange 33 engaged in the opening 31. The direction Z—Z is substantially at 90° relative to the inlet conduit 13a. Therefore, the body B comprises, outside, a semi-cylindrical enlarged portion 37 adapted to receive the strainer G. The interior of the portion 37 communicates with the suction chamber 13b and extends through the downstream end of the inlet conduit 13a in front of an opening 38 provided for introducing and withdrawing this strainer which has to this end a handling loop 39. The opening 38 is closed by a cover 40.

As can be seen, the distribution and inlet of the liquid occur entirely within the body B which, despite appearances, is simple in construction and can be very easily cast in one piece. It requires no machining, apart from that relating to the bearings 17, 21 and 25, the face 9 on which the body B is applied to the pump body A, and the screw-thread 38 adapted to receive the cover 40.

It will be observed that there are provided, in the base of the chamber 13b in the body B, two bleed orifices 41 closed by screws 42 (FIG. 1) and, laterally in the chamber 13b, an opening 43 communicating with the machined face 44 of a flange provided for connecting a pipe adapted to communicate at 45 with a delivery chamber 46, the pipe being outside the pump bodies and containing a stop valve which opens when the pressure in the delivery chamber reaches a predetermined value so as to permit the return of a part of the pumped liquid from this delivery chamber 46 to the suction chamber 13b in the known manner.

Owing to the fact that the whole of the distribution device is housed within the single lateral inlet body B, the body A receives no device attached thereto in a plane of assembly which is parallel with the axis Y—Y so that it comprises no screw-and-nut clamping devices for clamping in directions perpendicular to the axis Y—Y, which devices are liable to create in the course of pumping a relative displacement of the component elements of the pump, namely A, B, C, which could cause wedging of the shaft D. The absence of such an assembly plane therefore avoids, in the construction according to the invention, this serious disadvantage, the clamping effected by nuts 5 and 7 screwed on the studs 4 and 6 creating forces parallel with the axis Y—Y so that there can occur no sliding in a direction perpendicular to this shaft on the part of the elements B and C relative to the body A.

Although specific embodiments of the invention have been described, many modifications and changes may be made therein without departing from the scope of the invention as defined in the appended claims.

Having now described my invention what I claim as new and desire to secure by Letters Patent is:

1. In a centrifugal pump for conveying liquids: a longitudinal driving shaft, an impeller fixed on said shaft, a pump housing encompassing said impeller and comprising first and second transverse wall portions having respectively an inlet port and an outlet port; a cylindrical distributor body defining a cylindrical distribution chamber having an axis parallel with said shaft, said distributor body being fixed on said pump housing, said distributor body including two fluid connections; said cylindrical distributor body having a first orifice and a cylindrical wall portion provided with a second orifice; an auxiliary inlet body integral with said pump housing, said inlet body including an inlet chamber connected with said second orifice, said auxiliary inlet body further defining a suction chamber so that said second orifice communicates with said inlet port through said suction chamber along a path having a minimum length; said pump housing further including an outlet conduit defining an outlet chamber communicating with said outlet port and with said first orifice; and a rotatable cylindrical distributor member mounted in said distributor body for rotation about an axis of said distributor member to selectively put into communication said connections with the first and second orifices respectively in accordance with the angular rotational position of said distributor member about said axis of the latter.

2. In a centrifugal pump for conveying liquids: a longitudinal driving shaft, an impeller fixed on said shaft, a pump housing encompassing said impeller and comprising first and second transverse wall portions having respectively an inlet port and an outlet port; a cylindrical distributor body defining a cylindrical distribution chamber having an axis parallel with said shaft, said distributor body being fixed on said pump housing, said distributor body including two fluid connections, said cylindrical distributor body having a planar end face and a cylindrical wall portion and having a first orifice in said end face and a second orifice in said cylindrical wall portion, an auxiliary inlet body integral with said pump housing, said inlet body including an inlet chamber connected with said second orifice, said auxiliary inlet body further defining a suction chamber so that said second orifice communicates with said inlet port through said suction chamber along a path having a minimum length; said delivery body having an outlet conduit defining an outlet chamber communicating with said outlet port and with said first orifice; and a rotatable cylindrical distributor member defining a longitudinal axis and mounted in said distributor body for rotation about said longitudinal axis thereof to selectively put into communication said connections with the first and second orifices respectively in accordance with the angular rotational position of said distributor member about said axis of the latter.

3. Device according to claim 2, further including a descending sloped wall arranged in said auxiliary inlet body between said inlet chamber and said suction chamber, said sloped wall having a perforated wall portion, said inlet chamber and said suction chamber communicating with each other through said perforated wall portion.

4. Device according to claim 3, further including a filtering strainer arranged in said suction chamber and having an inlet end, said perforated wall portion having an aperture in the lower end thereof communicating with said inlet end of said strainer so that the major part of liquid current will follow a short path through said perforated wall portion while solid particles entrained in the liquid will slide on said sloped perforated wall and be collected in said strainer.

5. Device according to claim 4, further defined in that said strainer has a perforated strainer wall portion arranged obliquely in said suction chamber, said strainer further having a generally solid bottom and an apertured upper base member adapted to lie in the plane of said sloped wall when said strainer is in normal position in said suction chamber, said auxiliary body having an opening for introducing and removing said strainer, and a removable cover for closing said opening.

References Cited by the Examiner

UNITED STATES PATENTS

| | | | |
|---|---|---|---|
| 1,548,247 | 8/1925 | Bennett | 103—3 |
| 2,773,454 | 12/1956 | Berdelle-Hilge | 103—3 |
| 2,974,513 | 3/1961 | Clearman | 103—3 |

FOREIGN PATENTS

| | | |
|---|---|---|
| 207,448 | 12/1956 | Australia. |
| 868,915 | 10/1941 | France. |
| 17,471 | 7/1914 | Great Britain. |
| 303,596 | 1/1929 | Great Britain. |
| 107,058 | 9/1925 | Switzerland. |

LAURENCE V. EFNER, *Primary Examiner.*